Figure 1:
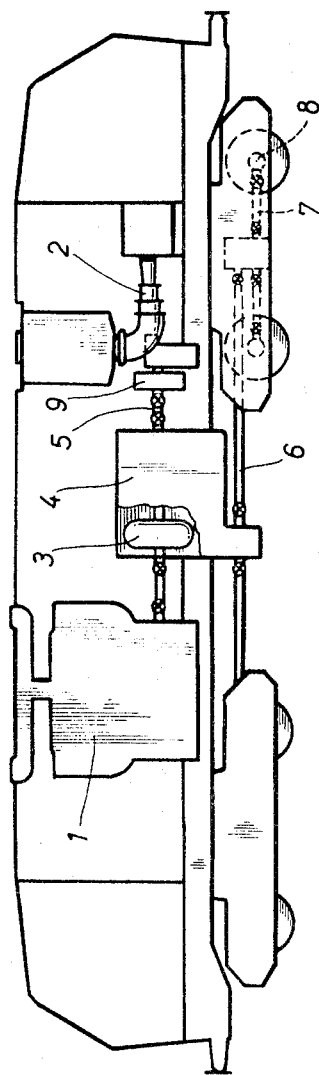

Sept. 20, 1966     G. OESTREICHER ET AL     3,273,515
LOCOMOTIVE WITH A MAIN AND AN AUXILIARY DRIVING MACHINE
Filed Nov. 23, 1964                    2 Sheets-Sheet 1

INVENTORS:
Georg Oestreicher
Georg Oberländer
BY

United States Patent Office 3,273,515
Patented Sept. 20, 1966

3,273,515
LOCOMOTIVE WITH A MAIN AND AN
AUXILIARY DRIVING MACHINE
Georg Oestreicher, Cologne-Deutz, and Georg Oberländer, Oberursel (Taunus), Germany, assignors to Klockner-Humboldt-Deutz Aktiengesellschaft, Cologne, Germany
Filed Nov. 23, 1964, Ser. No. 413,198
Claims priority, application Germany, Nov. 23, 1963, K 51,437
8 Claims. (Cl. 105—96.2)

The present invention relates to a self-propelling vehicle, especially locomotive, with a hydraulic transmission and a mechanical transmission following the hydraulic transmission and drivingly connected to the driving axles and, more specifically, concerns a vehicle of the above-mentioned type which also includes an auxiliary driving machine, namely a gas turbine, adapted selectively to be drivingly connected to the mechanical transmission in order to increase the driving output of the main driving machine, namely a diesel engine. The diesel engine and the gas engine are so designed and can be made effective in such a way that the total pulling force of both driving machines will be below the friction limit of the self-propelling vehicle. Moreover, the auxiliary driving machine can be connected to the driving system for the vehicle only at an intermediate driving speed for increasing the total pulling force of the self-propelling vehicle.

In connection with self-propelling vehicles of the above-mentioned type, it is known to increase the pulling force of a diesel hydraulic locomotive by feeding the output of the connectable gas turbine into the output shaft of the diesel engine, i.e. into the primary side of the hydraulic transmission which is represented by a converter. Such an arrangement, however, has the drawback that the hydraulic transmission has to be designed for transmitting the total combined output of the diesel engine and the gas turbine. Consequently, the hydraulic transmission has to have rather large dimensions.

The direct feeding of the output of the gas turbine into the driving axle, on the other hand, requires the provision of an intermediate transmission with a reversing gear of its own. The provision of two mechanical transmissions, however, brings about considerable power losses. Moreover, it considerably complicates the operating means. Another drawback of the just mentioned arrangement consists in the costs and space requirements for such arrangement. For feeding the output of the selectively connectable gas turbine directly into the driving axle, the axle drive becomes rather complicated and expensive.

It is, therefore, an object of the present invention to provide a self-propelling vehicle of the above-mentioned general type, which will overcome the drawbacks above referred to.

It is another object of the present invention to provide a self-propelling vehicle with a diesel engine followed by a hydraulic transmission drivingly connected to the driving axle of the vehicle, and with gas turbine, in which it will be possible to feed the output of said gas turbine into the driving axle or axles without having to go through the hydraulic transmission.

These and other objects and advantages of the invention will appear more clearly from the following specification in connection with the accompanying drawings, in which:

FIG. 1 diagrammatically illustrates a self-propelling vehicle with a hydraulic transmission and a mechanical transmission according to the invention.

Figure 2:
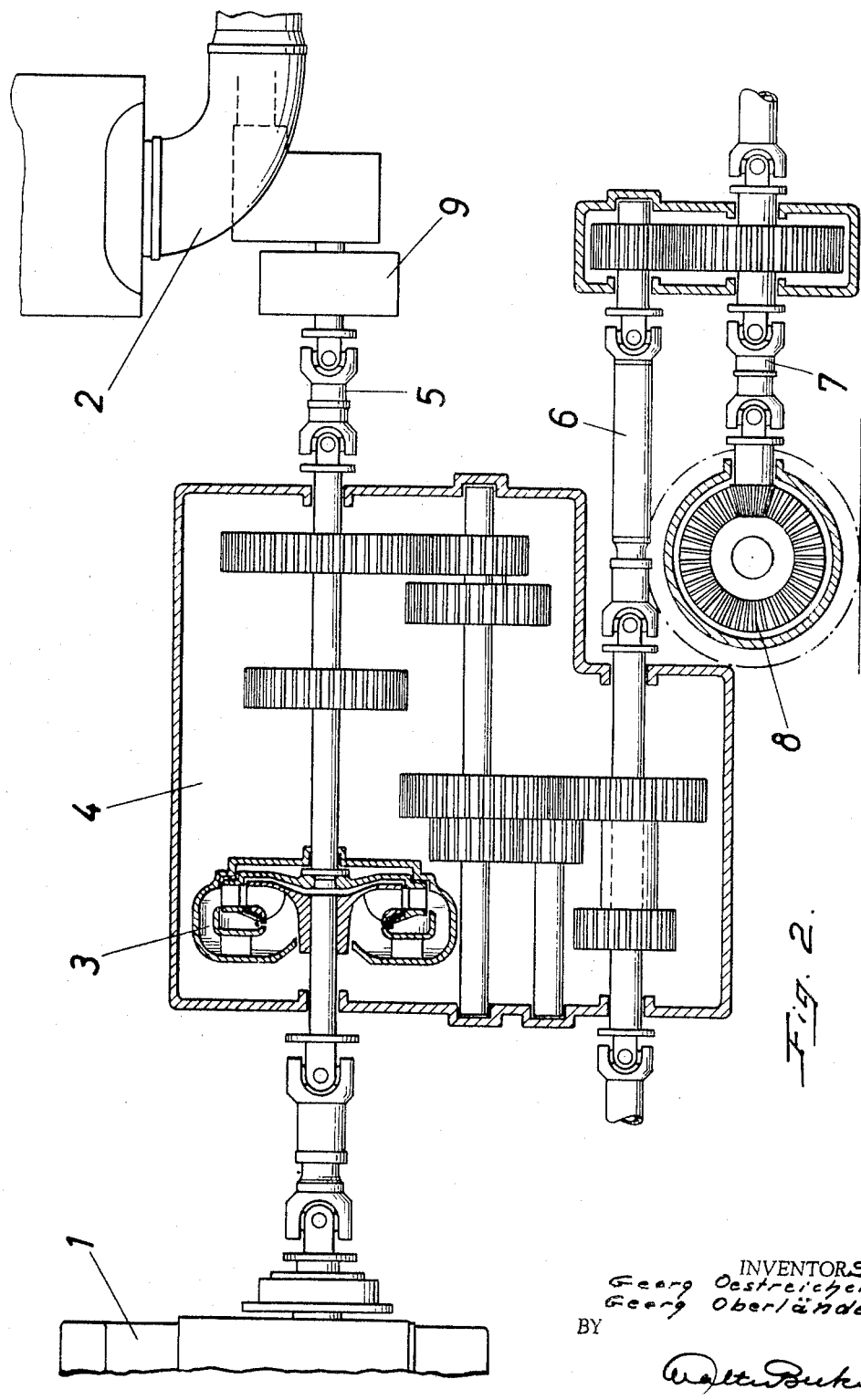

FIG. 2 illustrates on a considerably larger scale than FIG. 1 the transmission proper according to the invention.

The present invention is characterized primarily in that the output shaft of the auxiliary driving machine which is temporarily connectable to the output of the diesel engine is adapted to be coupled with the mechanical transmission following the hydraulic transmission.

The feeding of the output of the gas turbine into the secondary side of a hydraulic transmission is advantageous inasmuch as in this way the output of the auxiliary driving machine can be conveyed to the driving axle of the vehicle without having to convey the power flow of the gas turbine through the hydraulic transmission which has its primary side connected to the output shaft of the diesel engine. The arrangement according to the present invention, while taking advantage of the torque characteristic of the gas turbine, permits the loss-free connection of the output of said gas turbine to the output of the diesel engine. It will be appreciated that in this way the output of the gas turbine is not burdened with the losses of the hydraulic transmission and that the mechanical transmission required for the diesel engine is likewise used by the gas turbine. Nevertheless it is not necessary to design the mechanical transmission for a torque greater than that occurring during the starting movement of the vehicle because the torque during the start by the diesel engine only is higher than the combined torque load of the transmission by the diesel engine and gas turbine full load during the drive of the vehicle.

The total time during which the gas turbine is employed amounts to approximately from 20 to 25% of the life of the diesel engine so that the time for overhauling the total unit is practically uniform.

Referring now to the drawing in detail, the main driving machine or engine 1 may be a diesel engine. The output shaft of the diesel engine 1 is connected to the primary side of a hydraulic transmission 3 which is designed in conformity with the output of the diesel engine 1. The hydraulic transmission 3 is followed by a reversing or a change-over gear transmission 4. The transmission 4 is coupled with the output shaft 5 of a gas turbine 2. The power flow from the gas turbine, which may selectively be connected to or disconnected from transmission 4, to the axle transmission or axle drive 8 is effected through transmission 4 and universal joint shafts 6, 7 without passing through the hydraulic transmission 3.

The feeding of the gas turbine output into transmission 4 is effected preferably through the intervention of a disc clutch or a hydraulic coupling or a freewheel drive or overriding clutch 9 cooperating with a mechanical or hydraulic coupling.

While the present invention has been described with one main driving machine and one gas turbine only, it is, of course, to be understood that also a plurality of gas turbines may cooperate with one main driving machine, or a plurality of main driving machines may cooperate with one gas turbine.

It is furthermore to be understood that the present invention is, by no means, limited to the particular arrangement shown in the drawing, but also comprises any modifications within the scope of the appended claims.

What we claim is:

1. In combination with a self-propelled vehicle having a driving axle: a diesel engine, transmission means interposed between and drivingly connectable with said diesel engine and said driving axle for conveying driving energy from said diesel engine to said driving axle, said transmission means including a mechanical transmission and a hydraulic transmission interposed between said mechanical transmission and said diesel engine for conveying driving energy from said diesel engine to said mechanical transmission, and a gas turbine selectively connectable to said mechanical transmission for conveying additional driving power from said gas turbine through said mechanical transmission to said driving axle while bypassing said hydraulic transmission.

2. An arrangement according to claim 1, in which said mechanical transmission includes a reversing gear transmission.

3. An arrangement according to claim 1, in which said mechanical transmission includes a shift-over gear transmission.

4. In combination with a self-propelled vehicle having a driving axle: a diesel engine, transmission means interposed between and drivingly connectable with said main driving machine and said driving axle for conveying driving energy from said diesel engine to said driving axle, said transmission means including a mechanical transmission and a hydraulic transmission interposed between said mechanical transmission and said main driving machine for conveying driving energy from said main driving machine to said mechanical transmission, a gas turbine, and coupling means interposed between said gas turbine and said mechanical transmission and operable selectively to establish driving connection between said gas turbine and said driving axle through said mechanical transmission.

5. An arrangement according to claim 4, in which said coupling means is a mechanical clutch.

6. An arrangement according to claim 4, in which said coupling means is a hydraulic coupling.

7. An arrangement according to claim 4, which includes a free wheel drive interposed between said gas turbine and said mechanical transmission and operatively connected to said coupling means.

8. An arrangement according to claim 4, which includes an over-riding jaw clutch interposed between said gas turbine and said mechanical transmission and operatively connected to said coupling means.

References Cited by the Examiner

UNITED STATES PATENTS

| | | | |
|---|---|---|---|
| 1,631,661 | 6/1927 | Warren | 105—38 |
| 2,093,389 | 9/1937 | Reidinger | 60—21 |
| 2,443,720 | 6/1948 | Burrus | 74—661 |
| 2,779,212 | 1/1957 | Fell | 74—675 |

ARTHUR L. LA POINT, *Primary Examiner.*

B. FAUST, D. E. HOFFMAN, *Assistant Examiners.*